H. J. MASTENBROOK AND C. C. LAURITSEN.
TILTING OR GRAVITY TRAP.
APPLICATION FILED AUG. 30, 1919.
1,389,065.
Patented Aug. 30, 1921.
2 SHEETS—SHEET 1.
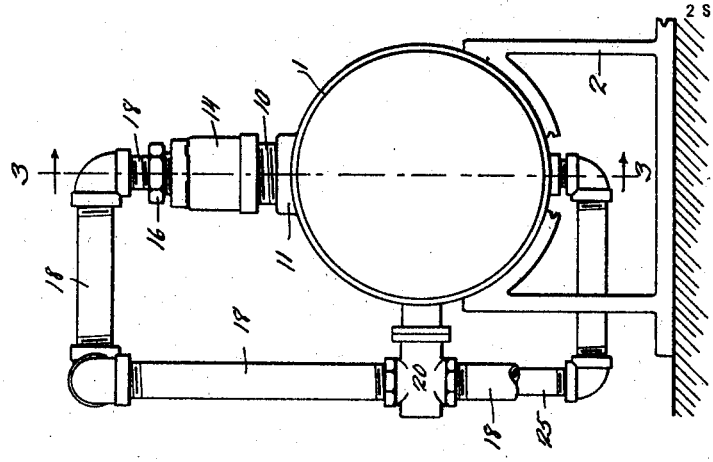
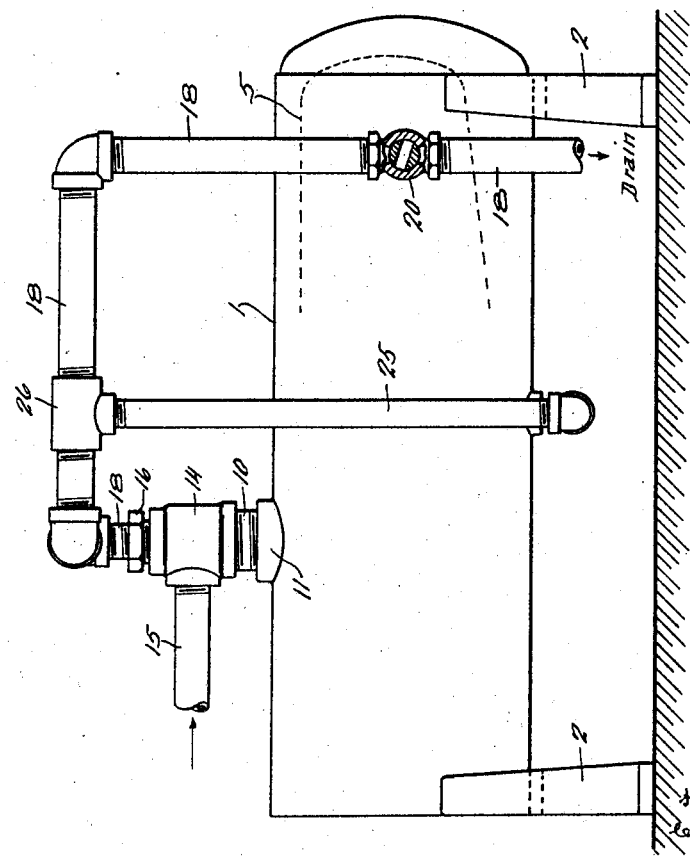
Inventors
Henry J. Mastenbrook
Charles C. Lauritsen
By Hull, Smith, Brock & Herbert
Attys.

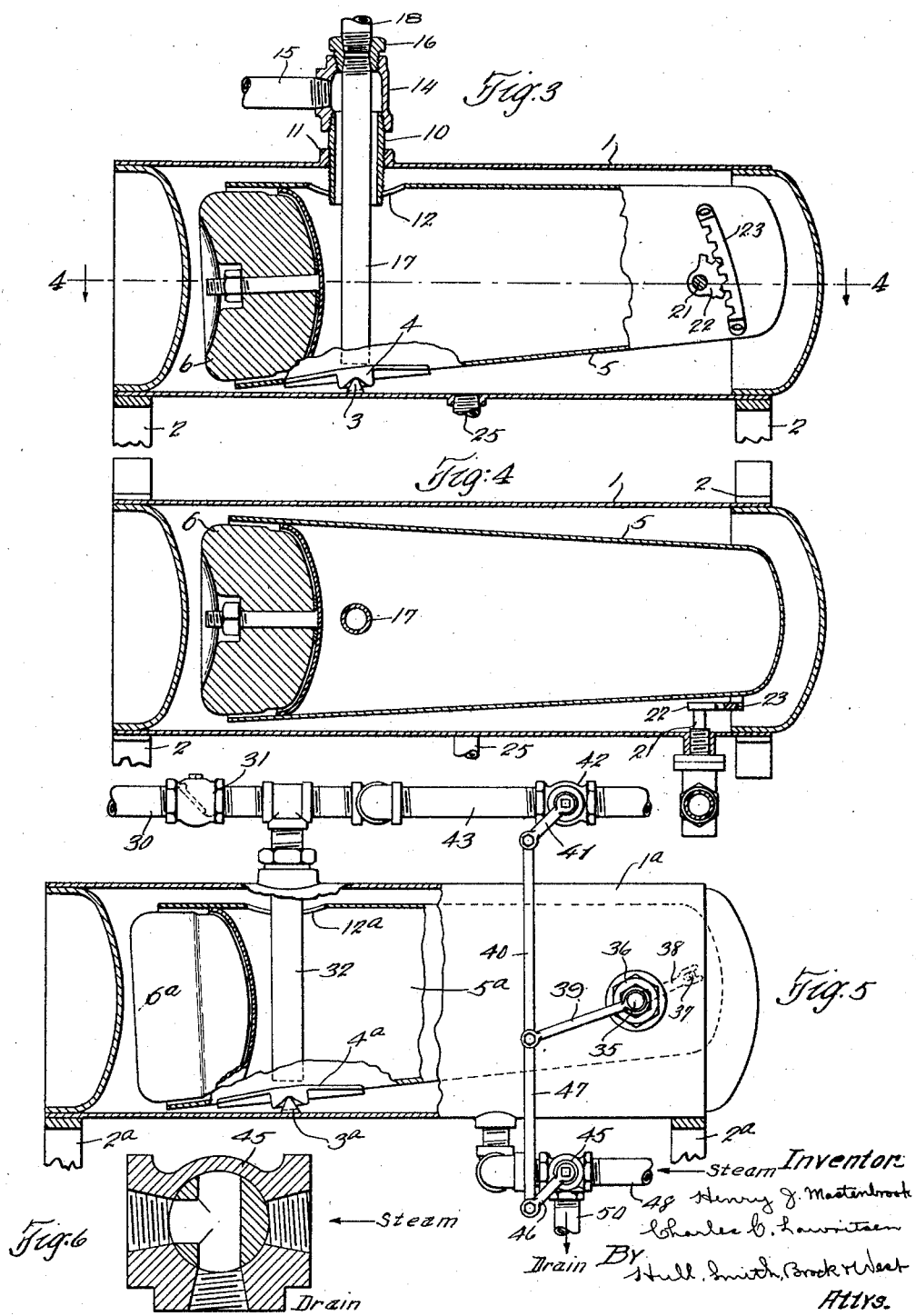

UNITED STATES PATENT OFFICE.

HENRY J. MASTENBROOK, OF LAKEWOOD, AND CHARLES C. LAURITSEN, OF CLEVELAND, OHIO, ASSIGNORS TO THE OHIO BLOWER COMPANY, OF CLEVELAND, OHIO, A CORPORATION OF OHIO.

TILTING OR GRAVITY TRAP.

1,389,065.  Specification of Letters Patent.  Patented Aug. 30, 1921.

Application filed August 30, 1919. Serial No. 320,941.

*To all whom it may concern:*

Be it known that we, (1) HENRY J. MASTENBROOK, (2) CHARLES C. LAURITSEN, (1) a citizen of the United States, (2) a subject of the King of Denmark, residing at (1) Lakewood, (2) Cleveland, in the county of Cuyahoga and State of Ohio, have invented a certain new and useful Improvement in Tilting or Gravity Traps, of which the following is a full, clear, and exact description, reference being had to the accompanying drawings.

This invention has reference to the class of tilting traps.

In prevailing types of tilting traps the tanks or vessels are pivotally supported through trunnions from a suitable base and ingress and egress to and from the tanks are gained either through the trunnions, which are made hollow for the purpose and equipped with packing glands, or through sections of flexible tubing. In both instances leakage and stiffness of action are very common difficulties, and correcting one invariably results in creating the other—e. g. if, in the case of the hollow trunnions, the glands or joints are made tight enough to prevent leakage for a material length of time, the tank sticks or acts sluggishly; and if the joints are left sufficiently loose to permit due freedom and promptness of action, leakage follows. Practical experience has proved that flexible tubing sufficiently pliable to allow the required freedom of action is unreliable and soon becomes leaky as a result of the continual bending to which it is subjected.

Now it is the aim of our invention to overcome these difficulties by incasing the tilting tank or vessel in a fluid tight chamber making it entirely unnecessary to employ packing glands or flexible tubing for the purposes hereinbefore stated, while producing a thoroughly efficient, durable, easy acting trap of the aforesaid class that is practically immune from disorder and which is adapted to all uses falling within the realm of its predecessors.

To these ends our invention may be defined as consisting of the combinations of elements set forth in the annexed claims and illustrated in the accompanying drawings which form a part hereof and wherein Figure 1 is a side elevation, and Fig. 2 an end elevation of our improved traps; Fig. 3 is a section on the line 3—3 of Fig. 2; Fig. 4 is a section on the line 4—4 of Fig. 3; Fig. 5 shows an installation of the trap differing somewhat from that of the previous figures; and Fig. 6 is a detail of one of the valves incorporated in the installation of Fig. 5.

Referring to the drawings by the use of reference characters, 1 is a fluid tight casing supported in a fixed position by standards 2. Resting upon a bearing element 3 in the bottom and near one end of the casing 1 is a saddle 4 that is secured to and supports a tank or vessel 5. The tank is thus pivotally supported through a bearing of the so-called "knife-edge" variety for free tilting movement within the casing, and what I shall term its outer end (that at the right in the drawings) is normally maintained in elevated position by a weight 6 that is applied, preferably adjustably, to the opposite end of the tank.

In the lay-out illustrated in Figs. 1 to 4, a nipple 10 of relatively large diameter is screwed through a boss 11 on the top of the casing 1 and projects through an opening 12 in the top of tank 5. A T 14 is applied to the upper end of the nipple 10 and into the lateral branch thereof is screwed the threaded end of a pipe 15 that may lead from a steam system and conduct water of condensation and steam to the trap. In the present construction a bushing 16 is threaded into the upper branch of the T 14 and connects a pipe 17, which descends through nipple 10 to within a short distance of the bottom of tank 5, with a discharge pipe 18 that is shown as made up of several sections connected by suitable elbows and including a valve 20. This valve may be and preferably is of the plug valve type and in a leak-proof manner its casing is connected to the casing 1 so that its stem 21 projects inside the casing where it has operative connection with the tilting tank 5, in the present instance through a segment of a pinion 22 secured to the stem and a segmental rack 23 that is carried by the tank and wherewith the pinion segment meshes.

A drain in the nature of a pipe 25 leads from the bottom of casing 1 and joins the discharge pipe 18 through a T 26.

With the trap equipped with the arrangement of piping described and situated below a steam system to which it has connection through pipe 15, it acts as a separating trap as follows: Water of condensation gravitates through pipe 15 and nipple 10 into the tank 5 until a quantity accumulates therein sufficient to overbalance the weight 6 and tilt the free end of the tank downward. This causes the rack 23 to oscillate the pinion segment 22 and open the valve 20 to permit the contents of tank 5 to discharge through pipe 17 and pipe 18. The flow from pipe 15 and the discharge from tank 5 continue until live steam follows the water of condensation into the casing 1 and displaces the water in tank 5 sufficiently to lighten the free end of the tank and allow weight 6 to depress its opposite end, elevating the free end and closing valve 20 as a consequence thereof by reason of the operative connection between the tank and valve already described.

While valve 20 is open, any water in casing 1 resulting from the condensation of steam therein may discharge through drain 25.

The foregoing operation automatically repeats itself upon each filling of the tank 5.

In Fig. 5 the elements of the trap are designated by the same reference numerals that are applied to the corresponding parts in the previous figures, augmented by the exponent $a$. Here the water of condensation flows through a pipe 30, containing a check valve 31, and a pipe 32 into the tank $5^a$, the flow continuing until the weight $6^a$ is overbalanced by the water accumulated within the tank. Upon the descent of the free end of the tank, a rock shaft 35, journaled in the side of casing $1^a$ and provided with a suitable packing gland 36, is oscillated by reason of its connection with a pin 37 on the tank and an arm 38 secured to the shaft and forked at its outer end to embrace the pin. An arm 39 is attached to the outer end of the shaft, and its free end is connected through a link 40, with the operating lever 41 of a valve 42 in a discharge pipe 43 that communicates with the interior of the tank through former pipe 32. The oscillation of shaft 35 as aforesaid elevates the free end of arm 39 and through link 40 opens valve 42. Simultaneously with the opening of valve 42, a valve 45, the operating lever 46 whereof is connected through a link 47 with arm 39, is actuated to establish communication between a steam line 48 and the interior of casing $1^a$. Valve 45 is a three-way valve as shown in the sectional detail of Fig. 6, and its intermediate branch connects with a drain 50 which communicates with the interior of the casing to the exclusion of the steam line when the valve is in normal condition as when the free end of the tank is elevated. Considering as we are that the free end of the tank is depressed, that valve 42 is open, and that the steam line 48 is in communication with the casing, steam under pressure fills the casing and enters the tank, forcing the water which the latter contains out through pipes 32 and 43, the check valve 31 preventing the steam from passing through pipe 30. This situation continues until the quantity of water in the tank has been sufficiently depleted to permit the tank to be overbalanced by weight $6^a$, when valve 42 will be closed and valve 45 returned to the position shown in Fig. 6 through their operative connections with the tank already described. Now the trap is in condition to receive further condensate through pipe 30, while any water resulting from the condensation of steam in casing $1^a$, or any steam pressure remaining within the casing, may escape through pipe 50.

This latter arrangement produces what is known as a direct return or pumping trap by means of which the water of condensation may be elevated to a higher level or returned directly to the boiler against whatever pressure may exist therein.

Having thus described our invention, what we claim is:—

1. In a trap of the character set forth, the combination of a casing, a vessel pivotally supported within the casing, the vessel being weighted to repose normally in a given position, means for conducting water of condensation directly into the vessel to the exclusion of the casing, the vessel being designed to tilt from normal position under the weight of an accumulation of water therein, a discharge conduit leading from the interior of the vessel, a valve in said conduit, operative connections between the vessel and valve, and means for admitting pressure fluid to the casing.

2. In a trap of the character set forth, the combination of an inclosing casing, an open vessel pivotally supported within the casing and reposing normally in a given position, means for conducting water of condensation from a steam system directly into the vessel to the exclusion of the casing, the vessel being designed to tilt under the weight of an accumulation of water therein, a discharge conduit leading from the vessel, a valve in said conduit, and operative connections between said valve and the vessel.

3. In a trap of the character set forth, the combination of an inclosing casing, an open vessel pivotally supported within the casing and reposing normally in a given position, means for conducting water of condensation to and from the vessel exclusive of the casing, the vessel being designed to tilt under the accumulation of water therein, means for conducting pressure fluid to the casing, the casing having a drain, a valve for controlling the discharge of water from the vessel and drainage from the casing, and operative connections between the valve and vessel.

4. In a trap of the character set forth, the combination of a casing, a vessel pivotally supported within the casing, the vessel being weighted to repose normally in a given position, means for conducting water of condensation directly into the vessel, the vessel being designed to tilt from normal position under the weight of an accummulation of water therein, a discharge conduit leading from the interior of the vessel, a valve in said conduit, operative connections between the vessel and valve, a drain for the casing communicating with the discharge conduit between the latter's point of communication with the vessel and the valve, and means for admitting pressure fluid to the casing.

5. In a trap of the character set forth, the combination of an inclosing casing, a bearing element within the lower portion of the casing, an open top vessel resting upon said bearing element so as to rock thereon, a weight tending to tilt the vessel in one direction, a conduit leading in through the wall of the casing and depending into the vessel, means for conducting water of condensation directly into the vessel to the exclusion of the casing, the vessel being designed to tilt in opposition to the aforesaid weight upon the accumulation of a given quantity of water therein, a valve in the aforesaid conduit, and operative connections between the valve and vessel.

6. In a trap of the character set forth, the combination of an inclosing casing, an open vessel pivotally supported within the casing and reposing normally in a given position, means for conducting condensation from a pressure fluid line directly into the vessel to the exclusion of the casing, a discharge conduit leading from the interior of the vessel through the wall of the casing, a valve within said conduit, the portion of the valve casing through which the valve actuating element extends being directly connected to the first mentioned casing whereby any leakage about the valve actuating element will be conducted to the inclosing casing and so that the valve actuating element is accessible from inside the latter casing, and operative connections between the valve and vessel.

7. In a trap of the character set forth, the combination of an inclosing casing, an open vessel pivotally supported within the casing and reposing normally in a given position, means for conducting condensation from a pressure fluid line into the vessel, a discharge conduit leading from the interior of the vessel through the wall of the casing, a valve within said conduit, the casing of the valve being applied to the first mentioned casing so that the valve actuating element is accessible from inside the latter casing, operative connections between the valve and vessel, and a drain conduit leading from the first mentioned casing and joining the former conduit between its point of communication with the vessel and the valve.

8. In a trap of the character set forth, the combination of an inclosing casing, an open top vessel pivotally supported within the casing and reposing normally in a given position, an inlet conduit extending through the top of the casing and into and terminating a comparatively short distance below the top of the vessel, a discharge conduit of smaller diameter than the former conduit extending from the interior of the vessel at a point adjacent the bottom thereof upwardly through the former conduit, a valve in the discharge conduit, and operative connections between the valve and vessel, the vessel being designed to tilt from normal position under the weight of an accumulation of water therein.

9. In a trap of the character set forth, the combination of an inclosing casing, a bearing element supported upon the bottom of said casing, a vessel, a bearing element applied to the bottom of the vessel and designed to rest upon the former bearing element, a weight applied to one end of the vessel and tending to maintain the opposite end thereof in elevated position, the vessel having an opening in its top disposed above the bearing elements, a discharge conduit leading in through the top wall of the casing and depending into the vessel to within a comparatively short distance of its bottom, means for conducting water of condensation to the vessel, a valve in the aforesaid conduit, and operative connections between the valve and vessel.

10. In a trap of the character set forth, the combination of an inclosing casing, a vessel pivotally supported within the casing and reposing normally in a given position, means for conducting condensate directly into the vessel to the exclusion of the casing, a discharge conduit leading from the vessel, the vessel being designed to tilt under the weight of an accumulation of condensate therein, and means operative by the tilting of the vessel for placing the trap in discharge condition.

In testimony whereof, we hereunto affix our signatures.

HENRY J. MASTENBROOK.
CHARLES C. LAURITSEN.